G. M. LITTLE.
ARC LAMP.
APPLICATION FILED MAY 10, 1906.
1,126,800.
Patented Feb. 2, 1915.
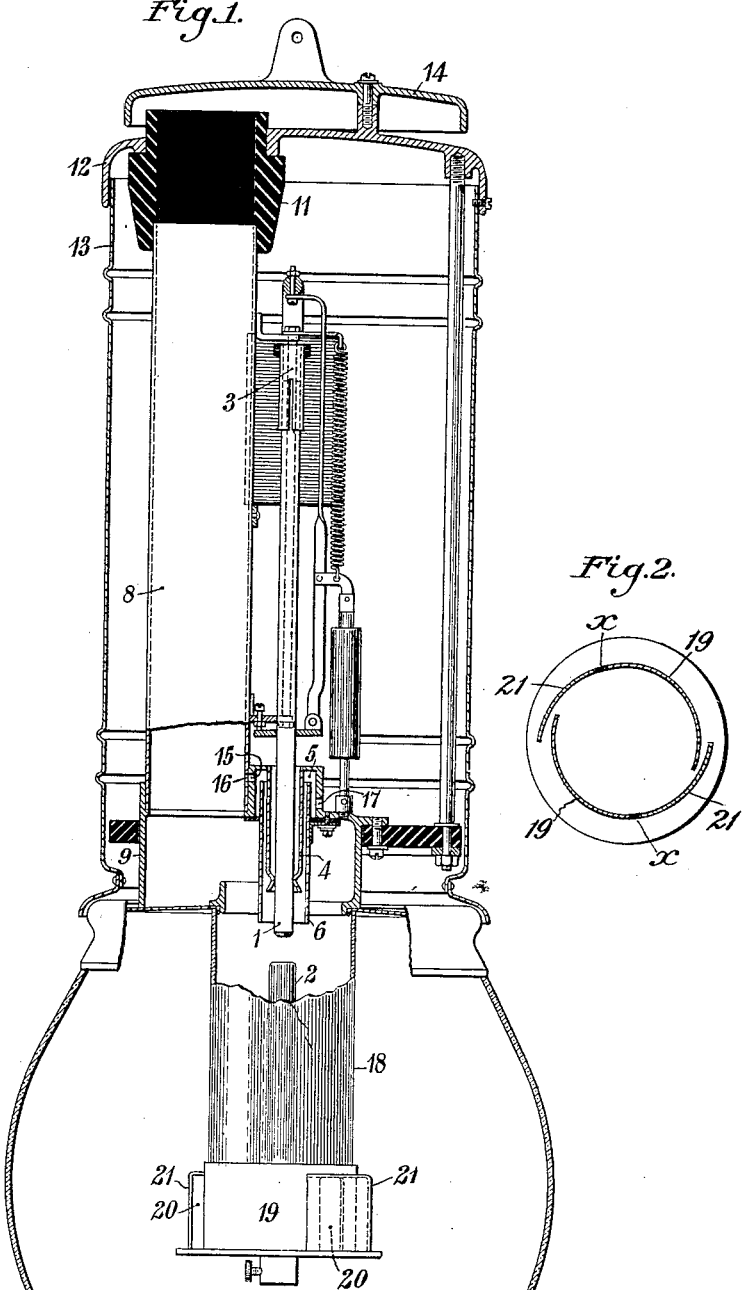
WITNESSES:
C. L. Belcher
Otto S. Schairer
INVENTOR
Geo. M. Little
BY
Wesley G. Carr
ATTORNEY

UNITED STATES PATENT OFFICE.

GEORGE M. LITTLE, OF PITTSBURGH, PENNSYLVANIA, ASSIGNOR TO WESTINGHOUSE ELECTRIC & MANUFACTURING COMPANY, A CORPORATION OF PENNSYLVANIA.

ARC-LAMP.

1,126,800.   Specification of Letters Patent.   Patented Feb. 2, 1915.

Application filed May 10, 1906. Serial No. 316,132.

*To all whom it may concern:*

Be it known that I, GEORGE M. LITTLE, a citizen of the United States, and a resident of Pittsburgh, in the county of Allegheny and State of Pennsylvania, have invented a new and useful Improvement in Arc-Lamps, of which the following is a specification.

My invention relates to arc lamps and particularly to those in which one or more electrodes are employed that are of such composition as will render the arc "luminous" or "flaming."

The object of my invention is to so construct and arrange the parts of an arc lamp of the character indicated that it may be rendered more efficient and satisfactory in operation than others heretofore provided.

Arc lamps have heretofore been provided with composition electrodes of such character that the arcs produced are more luminous and possess better color characteristics than those produced between plain carbon electrodes. A composition which has been found suitable and which is also much less rapidly consumed than carbon comprises magnetic oxid of iron, usually as its predominant constituent, which gives conductivity to the electrode both when hot and when cold, chromium oxid which by reason of its very high fusing point assists in preventing rapid consumption of the electrode and flickering of the arc, and titanium oxid which imparts color and brilliancy to the arc and also assists in prolonging the life of the electrode. Such an electrode is usually employed as the cathode in combination with a copper or other suitable metallic anode and the latter has heretofore been placed above the former. Since the most luminous zone of the arc occurs close to the composition electrode, the greater portion of the light is thrown upwardly, with such an arrangement. Fumes are also given off at the arc which have been found to contain the oxids of which the electrode is composed in a vaporous or volatile condition, and these fumes have been condensed and deposited upon the metallic electrode and other parts of the lamp in such a manner as to obscure a portion of the light and to interfere at times with the operation of the lamp.

According to the present invention, I propose to place the composition electrode above the metallic electrode in order that the greater portion of the light may be thrown downwardly without the use of reflectors, and I have further arranged the structural details of the lamp so that fumes and vapors may be conveyed directly from the arc to the exterior of the lamp without interfering with its operation.

Figure 1 of the accompanying drawing is a view, in section, through the casing of an arc lamp constructed in accordance with my invention, and Fig. 2 is a sectional view of some of the parts on the line II of Fig. 1.

Referring to the drawing, an upper electrode or cathode 1 is preferably composed, as hereinbefore described, of magnetic oxid of iron, chromium oxid and titanium oxid, while lower electrode or anode 2 is preferably composed of copper, brass, iron or other suitable metal. The upper electrode 1 is carried in a suitable holder 3 which is adapted to be operated so as to effect starting and feeding of the electrode in the usual manner by suitable means, such as that shown, which it is deemed unnecessary to describe because it does not differ materially in structure or mode of operation from others that are well known in the art.

The lower end of the electrode 1 is surrounded by and is guided in its operation by a tube 4 which extends downwardly through a chamber 5. The guide tube 4 is loosely surrounded by a cylindrical shell 6, the lower end of which opens a short distance above the lower end of the electrode 1 and the upper end of which extends into and opens near the top of the chamber 5. The cylindrical shell or tube 6 and the inclosed parts are located within and are surrounded by the lower offset end of an upwardly extending chimney that is composed of a tube or pipe 8 and a suitably constructed casing or shell 9. Suitably secured to the upper end of the tube 8 is an insulating bushing 11 that extends through a top or cap 12 of a sheet metal casing 13 for the lamp, its upper end opening underneath a cover or hood 14. The side wall of the chamber 5 is provided with an aperture 15 which registers with a corresponding aperture 16 in the lower end of the tube 8, a passage being thus provided between the upwardly extending tube 8 and the upper portion of the chamber 5. The wall of the chamber 5 is provided with one or more other apertures at 17 to afford communication between the interior of the casing for the lamp and the lower portion of the chamber 5.

In order to start operation of the lamp, the electrodes 1 and 2 are brought together and separated in the usual manner. The draft set up by the arc and the fumes given off by it, rise through the tube 6 into the chamber 5 from whence they escape through the apertures 15 and 16 into the upwardly extending tube 8 and therein produce a draft. The chamber 5 is of such capacity that the lamp may operate for a sufficient period of time to enable the hot air and fumes that escape therefrom through the apertures 15 and 16 to set up a draft within the tube 8 before the fumes fill the chamber and escape through the aperture or apertures 17 into the interior of the casing 13. When the draft is started in the upwardly extending passage, currents of air enter the chamber 5 through the aperture or apertures 17 and pass down the tube 6 around the electrode 1. Upon leaving the tube 6, the currents of air are immediately reversed and drawn into the surrounding passage provided by the casing 9 and the tube 8 by the upwardly directed draft therein, the fumes being in this manner effectually removed from the inclosing casing of the lamp. The downward draft around the electrode 1 prevents the fumes given off by the arc from rising into the chamber containing the operating mechanism of the lamp, which is therefore kept clean and free from deposits. In overcoming the natural tendency of the fumes to rise, the drafts also serve to keep an increased quantity of the fumes in the arc, which, becoming incandescent, render the arc more luminous than would otherwise be the case. The draft of clean air, being immediately reversed in direction upon leaving the tube 6, passes over the exterior surface thereof and effectually prevents the fumes from coming into contact therewith and from condensing thereon for a considerable distance from its lower end.

The lower electrode 2 is supported in a glass or other transparent globe 18 which serves to inclose the arc and which is provided with a cap or closure 19 at its lower end having slots or apertures at 20 in its circumferential surface. Vanes 21 are secured to the cap in such relation to the apertures at 20 that drafts of clean air are directed upon the inner surface of the globe in a direction substantially tangential to its circumference. In this manner, a clean layer of air is formed adjacent to the inner surfaces of the globe and of the casing 9 which constitutes the lower offset end of the upwardly extending chimney, and consequently the fumes are prevented from coming into contact therewith and depositing thereon. A rotation of the atmosphere within the globe is also effected which causes the arc to rotate. Rotation of the arc prevents beveling and uneven consumption of the composition electrode, which might otherwise occur because of non-homogeneity of its structure.

When the composition electrode is placed above the one composed of metal, as here shown, it has also been found that the fumes, which might condense on the upper electrode if the draft were not directed downwardly around it, are melted and volatilized by the arc in such a manner as not to seriously interfere with the operation of the lamp. The most luminous zone of the arc being close to the composition electrode, more light will be thrown downwardly than if the electrodes occupied the inverse positions. Also, when the composition electrode is placed above the other, the fused pool of the material which forms on its end serves as a reflector which throws the light downwardly. And it has been found further, with this arrangement of the electrodes, that the same amount of light may be obtained in a horizontal direction from the lamp and beneath it as may be obtained when the metallic electrode is placed above the other, with from 15 to 20 per cent. less voltage between the electrodes.

Obviously, the structural details and arrangements of the parts of the lamp may be considerably varied from what I have here shown and described without altering its mode of operation or departing from its spirit and I desire that all such modifications be included within its scope.

I claim as my invention:

1. In an arc lamp, the combination with electrodes, of walls providing annular passages around one of them in which drafts are oppositely directed and an aperture in the wall separating the passages and providing communication between the same.

2. In an arc lamp, the combination with electrodes, and means for providing substantially concentric annular passages around one of them in which drafts are oppositely directed, of a part having a chamber into which the upper end of the inner passage opens and also having apertures that afford communication respectively with the upper portion of the chamber and the outer passage and with the lower portion of the chamber and the exterior.

3. In an arc lamp, the combination with a tube having an offset at its lower end, of a smaller tube that is located in the offset end and projects through one side thereof, and means which affords communication between the protruding end of the smaller tube and the larger tube.

4. In an arc lamp, the combination with an electrode, and a tube having an offset at its lower end, of a smaller tube that loosely surrounds the electrode and projects through one side of the larger tube into the offset end thereof, and means which affords communication between the protruding end of the smaller tube and the larger tube.

5. In an arc lamp, the combination with an electrode, and a tube having an offset at its lower end, of a smaller tube that loosely surrounds the electrode and projects through one side of the larger tube into the offset end thereof, and a part having a chamber into which the protruding end of the smaller tube projects and also having apertures that afford communication between the upper portion of the chamber and the outer tube and between the lower portion of the chamber and the exterior.

6. An arc lamp comprising a consumable cathode, a substantially non-consumable stationary anode, the cathode being placed above the anode, means for feeding the cathode downwardly and means for directing a draft downwardly around the cathode.

In testimony whereof, I have hereunto subscribed my name this 1st day of May, 1906.

GEORGE M. LITTLE.

Witnesses:
OTTO S. SCHAIRER,
BIRNEY HINES.

Copies of this patent may be obtained for five cents each, by addressing the "Commissioner of Patents, Washington, D. C."